United States Patent [19]

Goetze et al.

[11] Patent Number: 4,933,012

[45] Date of Patent: Jun. 12, 1990

[54] AQUEOUS COATING FOR COPY PAPER, AND A PROCESS FOR THE PRODUCTION THEREOF

[75] Inventors: Richard Goetze, Mehring-Od; Maximilian Kerbl, Emmerting, both of Fed. Rep. of Germany

[73] Assignee: Wacker Chemie GmbH, Munich, Fed. Rep. of Germany

[21] Appl. No.: 296,205

[22] Filed: Jan. 11, 1989

[30] Foreign Application Priority Data

Feb. 19, 1988 [DE] Fed. Rep. of Germany ....... 3805265

[51] Int. Cl.[5] ........................... C08K 3/00; C08L 1/00

[52] U.S. Cl. ..................................... 106/204; 106/22; 106/169; 106/194; 106/450; 524/413

[58] Field of Search ................... 106/194, 22, 450, 21, 106/169, 204; 427/150; 524/413

[56] References Cited

U.S. PATENT DOCUMENTS

| | | | |
|---|---|---|---|
| 4,035,196 | 7/1977 | Remer | 106/450 |
| 4,087,284 | 5/1978 | Golden et al. | 106/21 |
| 4,822,769 | 4/1989 | Langlais et al. | 106/21 |

*Primary Examiner*—Theodore Morris

*Attorney, Agent, or Firm*—Burgess, Ryan and Wayne

[57] ABSTRACT

Aqueous coating of copy paper based on a porous inorganic matrix, an elastifying organic polymer and the color paste included in the pores. The inorganic matrix comprises a $Zr^{4+}$ polycondensate or Zr/Al mixed oxide gel, which is preferably elastified by addition of alkali-soluble polyacrylates or poly(vinyl acetates) or water-soluble poly(vinyl alcohols) and contains the color paste included in the pores. For production, an aqueous solution or dispersion of the polymer is initially introduced, adjusted to a pH of from 8 to 9 by adding ammonia, and the color paste and an aqueous solution of the Zr compound are subsequently admixed. The coating composition is applied to a backing material and dried in a known manner.

10 Claims, No Drawings

AQUEOUS COATING FOR COPY PAPER, AND A PROCESS FOR THE PRODUCTION THEREOF

BACKGROUND OF THE INVENTION

The invention relates to an aqueous coating for copy paper comprising a porous, inorganic matrix, an elastifying organic polymer and a color paste included in the pores.

Originally, carbon paper coatings comprised compositions which contained waxes and coloring pigments, for example, carbon black. These coatings had the particular disadvantage that due to the soft wax coating, they tended to smear on handling, and the adhesion of the copy print was poor. In addition, only a small number of copies was possible using wax coatings of this type.

RELATED ART

At the beginning of the 1960's, such systems were replaced by "solvent carbon papers". In solvent carbon papers, high molecular weight polymers are dissolved in readily volatile solvents. A colorant and a non-solvent, for example, mineral oil, are incorporated into the solution. After application, the solvent is evaporated and the polymer forms a spongy, porous structure in which pores the color paste is included. A coating of this type is claimed in DE-AS 1,095,860. The "solvent carbon papers" have the advantage, compared with carbon papers based on wax, that the handling is improved and the number of copies which can be achieved is also increased. The disadvantage of these systems is the release of large amounts of physiologically unacceptable solvents such as toluene, during production. In addition, the large amounts of volatile solvents make production a high risk activity with respect to industrial safety (danger of explosion).

A copy paper coating based on aqueous dispersions is claimed in the DE-AS 1,237,145 (CA-A 771,594). In this process, an aqueous dispersion whose continuous phase comprises a synthetic resin poly(vinyl alcohol) dissolved in water and whose disperse phase contains the colorant dispersed in oil is applied to the backing material and dried by heating. During the process, the resin gels to form a microporous sponge whose pores are filled with the colorant dispersion. In order to accelerate the curing process, organic or inorganic crosslinking agents such as N-methylolurea or chromium compounds can be added in the dispersion.

The colorant dispersion has poor shelf life in the presence of a cross-linking agent. If a cross-linking agent is not added to the dispersion or if a cross-linking agent of only moderate reactivity is used, formation of a satisfactory sponge structure within an acceptable temperature range cannot be achieved.

In addition, the shelf life of the copy paper is unsatisfactory. Post-cross-linking and migration phenomona occur, resulting in a change in the copying behavior of the coated copy paper on storage.

In this process, the coating quality depends on the control of temperatures during curing. If formation of the sponge structure is not smooth, the copying paste bleeds into the intermediate layer or out to the surface of the copy paper. As a result, adhesion of the copy print is poor and an uneven, thick print or soiling on handling and smearing of the copy print occurs.

In particular, if the glass transition temperature of the polymer to be cross-linked is high in relation to the process temperature, difficulties arise with film formation. As a result, the fims crack, have poor adhesion, poor mechanical strength and poor reproducibility.

The present invention combines the advantages of "solvent carbon papers" and aqueous coaing systems without the abovementioned disadvantages.

BRIEF DESCRIPTION OF THE INVENTION

According to the present invention, a coating for a copy paper, stable in storage, providing good copy print adhesion, even printing which is non-soiling and non-smearing and which can produce a large number of copies is provided by a composition for coating a substrate which comprises an aqueous dispersion comprising an inorganic porous matrix, a copy paste which can depose themselves into the inorganic matrix during film formation and an organic water-soluble or water-dispersible elastifier polymer for the inorganic matrix. The elastifier polymer in combination with the inorganic, porous matrix composition provides a flexible, mechanically stable copy transfer layer which adheres well to the backing material. The present invention also includes an overcoating composition which does not include the pigmented paste.

The invention further comprises a coated copy paper on a customary backing material, wherein the coating comprises a porous, inorganic matrix of $Zr^{4+}$ polycondensate or $ZrO_2.Al_2O_3$ gel which is elastified by a film-forming organic polymer and in which pores the colorant, dispersed in an oil, is included.

The invention further comprises a process for the production of a coated copy paper, which comprises mixing an inorganic polymer in a 10 to 50% by weight aqueous solution or dispersion, adjusted to a pH of from about 8 to about 9 by addition of ammonia, with a color paste and a zirconium containing composition in about a 5 to about 20% by weight aqueous solution, applying the coating composition to a backing, and effecting drying at a temperaure of from about 40° to about 60° C.

DETAILED DESCRIPTION OF THE INVENTION

The porous inorganic matrix comprises polycondensates of water-soluble $Zr^{4+}$ compounds or water-soluble Al/Zr mixed oxide compounds. Water-soluble $Zr^{4+}$ compounds are preferred. Ammonium zirconium carbonate is particularly preferred. These compounds are distinguished, by the fact that, with $NH_3$ in an alkaline medium they form low-molecular-weight associations with excellent shelf life. It is not until the coating is formed and the ammonia evaporated that the composition polycondensates to form zirconium oxide hydrates $ZrO_2.xH_2O$ or $ZrO_2/Al_2O_3$ gels (Gmel in 42 (1958), pp. 251 and 444) having the microporous matrix.

The zirconium or Al-Zr compositions preferably in aqueous solution, are added to the alkaline mixture of the other coating components during production of the coating composition. The concentration of Zr compositions or Zr/Al compositions in the aqueous solution is preferably about 5 to about 20% by weight.

However, the microporous inorganic matrix formed by applying the inorganic Zr or Zr/Al components to the backing is not suitable for use in the copy paper coating due to its brittleness. Therefore, film-forming organic polymers which flexibilize the inorganic matrix and make it mechanically resistant and improve the adhesion of the microporous matrix to the backing material must be incorporated into the coating composition.

Water-soluble or alkali-soluble polymers or water-dispersible polymers are particularly useful for elastification of the inorganic matrix; water or alkali soluble polymers are preferably employed. Alkali-soluble polymers are particularly preferred.

Preferred alkali-soluble polymers are polyacrylates and poly(vinyl acetates) which contain from about 5 to about 15% by weight of carboxyl group-containing comonomers such as, for example, (meth)acrylate, itaconic, crotonic, maleic or fumaric acid units. It is also possible to use alkali-soluble polyesters or alkyds.

Suitable water-soluble polymers include poly(vinyl alcohols), celluloses (hydroxyethyl-, methyl- and carboxy methyl cellulose), polyacrylamides, polyacrylic acids and polyvinylpyrrolidones. Poly(vinyl alcohols), in particular, poly(vinyl alcohols) which are soluble in cold water and have hydrolysis numbers between about 100 and about 300, are preferably employed.

Examples of water dispersible polymers are poly (vinyl acetates), vinyl acetate/ethylene copolymers, vinyl acetate/ethylene/vinyl chloride copolymers, polyacrylates, polyurethanes and SBR lattices.

The polymers can be cross-linked after coating in order to improve with water resistance. The cross-linking agents used for this p urpose are water-miscible or water-dispersible. The cross-linking agents should be reactive in the temperature range used for processing and have adequate pot life. The cross-linking agents are preferably polyaziridines, di- or polyaldehydes (glyoxal), melamine cross-linking agents, urea cross-linking agents, blocked isocyanates or polyepoxides.

The amount of crosslinking agent is selected so that the desired improvement in water resistance is achieved without loss in the desired flexibility of the coating. The crosslinking agents are preferably employed in an amount of from about 5 to about 40% by weight, more preferably in an amount of from about 5 to about 20% by weight, based on the polymer.

The weight ratio between the organic polymer and the inorganic matrix in the copy paper coating is from about 1:1 to about 5:1, preferably from about 1:1 to about 3:1, the proportion of binder (inorganic matrix and organic polymer) in the coating being from about 20 to about 80% by weight.

The copy paper coating may be modified by further additives. For example, the coating containing the porous matrix can be made more flexible by including plasticizers in the polymers. The plasticizers must be compatible with the polymers used and should, as far as possible, be immiscible with the copy paste. The amounts and types of plasticizers are known and are described in the technical literature (cf. Modern Plastics Encyclopedia 1981-1982, pp. 710-719.

In order to provide optimum processing properties for the coating composition, cosolvents canbe incorporated into the coating compositions. Cosolvents are water-soluble or partially water-soluble organic solvents such as alcohols, glycols. glycol ethers, esters, ketones, aminoalcohols and lactones. The amounts of cosolvents in the composition range from about 1 to about 50% by weight, preferably about 3 to about 25% by weight of the aqueous coating composition.

Colorants used in the copy paper coating composition according to the invention are known organic or inorganic pigments. Examples of colorants include phthalocyanine blue, permanent ruby, carbon black and titanion dioxide. The pigmemts are dispersed in oil (for example paraffin oil) as a paste. The oil:pigment weight ratio is from about 1:1 to about 2:1. The proportion of the color paste in the coating is from about 20 to about 80% by weight.

If preprepared pigment compositions are not used, the production of the pigment paste is carried out in a known manner. The pigment is dispersed in an oil by abrasion on a roll mill. If necessary, wetting agents and dispersants can be used concomitantly in order to make the grinding process more ecomonical to fully utilize the tinctorial strength potential of the organic pigments, some of which are very expensive, and to obtain color pastes with adequate shelf life. Suitable wetting agents are predominantly ionic and non-ionic surfactants. The dispersants are commercially available preparations with the type and quantity used in each case corresponding to the manufacturer's instructions.

In order to produce the coating composition, the organic polymer is initally present in about a 10 to about 50% by weight solution or dispersion, and a polymer content of 10 to 20% by weight is established, by adding water or a mixture of water and water-miscible organic solvents (for example ethanol). The pH of the polymer solution or dispersion is adjusted to the range of about 8 to about 9 by adding ammonia. Preferably a concentrated aqueous ammonia solution is used. In order to accelerate the dissolution process, the mixture can be warmed gently when polymer dispersions of alkali soluble polymers are used. After dissolution of the polymer, the color paste is admixed and dispersed. The zironcium compound is subsequently admixed in about a 5 to about 20% by weight solution.

If a crosslinking agent for the organic polymer is incorporated into the compositions, the appropriate amount of crosslinking agent, in about a 10 to about a 30% by weight aqueous dispersion, is added as the final component, preferably immediately before application.

In a preferred embodiment, alkali-soluble polymers are used, a pH of about 8 to about 10 is established by adding a neutralizing agent after polycondensation of the zirconium compound. Suitable neutralizing agents for this purpose are volatile bases, including ammonia, organic amines (methylamine, dimethylamine, ethylamine or diethylamine), aminoalcohols (aminoethanol or ainopropanol) or N-alkylaminoalcohols (dimethylaminoethanol).

The amounts of zirconium compositions, organic polymer and color paste in the composition are selected so that the above-mentioned weight ratios are established in the copy paper coating.

In order to produce the copy paper, the coating composition is applied to backing materials such as, for example, paper and plastic films made of polyester or nonwoven fabric. Application is by known methods, which include knife coating, roller coating or pouring in a wet-film thickness of 12 to 100 μm.

After application, the coating can be dried at a temperature of 40° to 160° C. in a stream of hot air or by irradiation with infra-red light. In a specific embodiment, the coated copy paper is overcoated with a colorant-free composition of the invention in the manner just described.

EXAMPLES 1-4

Production Of A Pigment Paste

EXAMPLE 1

20 parts of Heliogen Blue D 70 82 T (BASF Siegele) are ground in 20 parts by weight of viscous paraffin oil (Merck, Darmstadt) in a laboratory triple-roll mill until the paste is fully homogeneous.

EXAMPLE 2

The paraffin oil as prepared in Example 1 is replaced by 20 parts by weight of chlorinated paraffin 40 (Hoechst AG) and 15 parts of Heliogen Blue D 70 82 R. The chlorinated paraffin has a higher specific gravity than the paraffin oil.

EXAMPLE 3

The original color paste as employed in "solvent carbon paper" is based on Lanolin, carbon black and a little phthalocyanine pigment.

EXAMPLE 4

8 parts of Printex 35 (Degussa) and 1 part of Heliogen Blue D 70 82 T are ground in 18 parts of viscous paraffin oil (Merch, Darmstadt) in the presence of 0.5 parts of Lipotin pur (Lucas Meyer) as a dispersant in a triple-roll mill to full dispersal.

EXAMPLES 5-12

Production of the coating composition

EXAMPLE 5

23.1 parts of a 45 percent by weight alkali soluble acrylate dispersion (Vinnapas® Dispersion LL 31, Wacker-Chemie) is adjusted to a solids content of 20 percent using water and ethanol (20 percent, based on the solids content of the dispersion). The pH is increased to 8 by adding concentrated ammonia and the mixture is then warmed gently in order to accelerate the dissolution proces. 8.5 parts of color paste from Example 1 are carefully dispersed in the solution in a bead mill. 26 parts of a 20% by weight aqueous solution of ammonium zirconium carbonate (AZC from MEL) in 52 parts of water are then stirred in. After thorough mixing, the composition is separated from the beads. Before application, the composition must be mixed using a high-speed mixer.

EXAMPLE 6

The coating composition was prepared as described in Example 5 and comprised:

40 parts of Vinnapas® Dispersion LL 533 (Wacker-Chemie),
0.08 parts of Texapon® K 12 (Henkel),
8.5 parts of color paste from Example 1
Mixture of
20 parts of water
20 parts of ammonium zirconium carbonate solution (20% by weight, MEL)

EXAMPLE 7

The composition was prepared as described in example 5 and included 20% by weight of polyaziridine (XAMA® 2, Cordova), based on the weight of the polymer, as crosslinking agent added before application of the coating.

EXAMPLE 8

The composition was prepared as described in Example 5 and comprised:

40 parts of Vinnapas® Dispersion LL 533 (Wacker-Chemie), 20% by weight in water, pH 9
0.08 part of Texapon® K 12 (Henkel)
16 parts of color paste from Example 1
Mixture of
16 parts of water
16 parts of ammonium zirconium carbonate solution (20% be weight, MEL), addition of
3.2 parts of XAMA® 2 (Cordova) before application of the coating.

EXAMPLE 9

The composition was prepared as described in Example 5 and comprised:

45 parts of Vinnapas® C 305 (Wacker-Chemie), 20% by weight in water, pH 8.5
12 parts of color paste from Example 1
Mixture of
25 parts of water
15 parts of ammonia zirconium carbonate solution (20% by weight, MEL), addition of
2.4 parts of XAMA® 2 (Cordova) before application of the coating.

EXAMPLE 10

The composition was prepared as described in Example 5 and comprised:

40 parts of Polyviol® M 05/190 (Wacker-Chemie), 10% by weight in water,
10 parts of Polyviol® W 28/10 (Wacker-Chemie), 10% by weight in water
10 parts of color paste from Example 1.
Mixture of
10 parts of water
12 parts of ammonium zirconium carbonate solution (20% by weight, MEL),
0.6 parts of Wacker S 670 defoamer.

EXAMPLE 11

The composition was prepared as described in Example 5 and comprised:

50 parts of Vinnapas® Dispersion LL 533 (Wacker-Chemie). 20% by weight in water containing 10% by weight of ethoxypropanol,
10 parts of color paste from Example 4.
50 parts of a mixture of 10 parts of ammonium zirconium carbonate solution (20% by weight, MEL) and 40 parts of water,
1.5 parts of Plastilit 3060 (BASF).

The mixture is subsequently re-dispersed on a triple roll mill.

EXAMPLE 12

The suitability of the system containing inorganic matrix formers as a topcoat for improving the mechanical and print properties was tested using the following formulation 50 parts of Vinnapas® Dispersion LL 531 (Wacker-Chemie), 10% by weight in water containing 10% by weight of ethoxypropanol,
10 parts of ammonium zirconium carbonate solution (20% by weight, MEL)

This mixture was applied in a wet-film thickness of 15 μm to a highly smearable coating. It was thereby possible to improve the values as follows Print strength from 3 to 1

Regularity from 3 to 1

Number of copies from 5 to 10

Soiling of the copy from 3 to 1

Soiling of the hands from 3 to 1

(0 best score 3 worst score, see Table 1)

COMPARATIVE EXAMPLE 1

The composition was prepared as described in Example 5, without addition of the inorganic matrix former ammonium zirconium carbonate.

40 parts of Vinnapas ® Dispersion LL 533, 20% by weight in water, pH 9

0.08 part of Texapon ® K 12 (Henkel)

16 parts of color paste of Example 1.

COMPARATIVE EXAMPLE 2

The composition was prepared as described in Example 5, without addition of the inorganic matrix former ammonium zirconium carbonate.

40 parts of Vinnapas ® Dispersion LL 533, 20% by weight in water, pH 9

0.09 part of Fluorad ® FC 129 (3M Company)

25 parts of color paste of Example 3.

COMPARATIVE EXAMPLE 3

A coating based on a crosslinked organic polymer without addition of an inorganic matrix former was prepared.

A mixture of 36 parts of color paste of Example 3 and 1.2 parts of Polyaziridine (Neocryl ® CX 100, Polyvinylchemie) is carefully dispersed in 60 parts of a 20% by weight solution of an alkali-soluble polyacrylate (Vinnapas ® Dispersion LL 533) at pH 9 in a bead mill. Before application, the composition was adjusted to a processing viscosity using 30 parts of water.

The coating in the Examples and Comparative examples was applied at a wet-film coating thickness of 50 μm onto polyester film as the backing material and dried at 80° to 120° C. The copy paper was subsequently tested for cracking, print strength, regularity of the print, number of readily readable copies, soiling of the copy and soiling of the hands.

The results are collated in Table 1.

TABLE 1

| I | II | III | IV | V | VI | VII | VIII | IX | X | XI | XII | Evaluation |
|---|---|---|---|---|---|---|---|---|---|---|---|---|
| 5 | Acrylate | 1.25 | + | − | 120 | 0 | 1 | 0 | >10 | 0 | 1 | no detectable aging of the coating |
| 6 | Acrylate | 1.00 | + | − | 120 | 0 | 1 | 0 | >10 | 1 | 1 | coating becomes brittle on storage |
| 7 | Acrylate | 1.00 | + | + | 120 | 0 | 1 | 0 | >10 | 1 | 1 | no detectable aging of the coating |
| 8 | Acrylate | 0.5 | + | + | 120 | 0 | 1 | 1 | >10 | 2 | 1 | no detectable aging of the coating |
| 9 | PVAc | 0.77 | + | + | 120 | 0 | 0 | 1 | >10 | 0 | 0 | no detectable aging of the coating |
| 10 | PVA1 | 0.5 | + | − | 120 | 0 | 0 | 1 | >10 | 1 | 2(6) | aging not tested |
| 11 | Acrylate | 1.00 | + | − | 80 | 0 | 1 | 1 | 10 | 1 | 0 | |
| Cf. Ex. 1 | Acrylate | 0.5 | − | − | 120 | 3 | 3 | 2 | 4 | 3 | 3 | aging not tested |
| Cf. Ex. 2 | Acrylate | 0.33 | − | − | 80 | 2 | 3 | 2 | 3 | 2 | 1 | considerable aging of the coating, print becomes weaker |
| Cf. Ex. 3 | Acrylate | 0.33 | − | + | 80 | 3 | 1 | 3 | 8 | 2 | 1 | considerable aging of the coating, print becomes weaker |

I: Example No.
II: Binder
III: Binder/color paste ratio
IV: Inorganic matrix former
V: Crosslinking additive
VI: Drying temperature
VII: Cracking(1)
VIII: Print strength(2)
IX: Print regularity(3)
X: Number of readable copies
XI: Soiling of the copy(4)
XII: Soiling of the hands(5)
(1) 0: none; 3: considerable
(2) 0: somewhat weak; 1: clear; 2: fairly strong; 3: bold
(3) 0: very even; 3: very uneven
(4) 0: none; 3: considerable
(5) 0: none; 3: considerable
(6) coating without crosslinking agent is not stable to perspiration from the hands

What is claimed is:

1. A copy coating comprised of a porous inotganic matrix of a $Zr^{+4}$ polycondensate or a $ZrO_2.Al_2O_3$ gel, an elastifying amount of a film-forming water-soluble or water-dispersible organic polymer, and an oil dispersion of a pigment paste colorant included in the pores of said matrix.

2. A coating of claim 1 wherein the organic polymer is crosslinked.

3. A coating of claim 1 wherein the elastifying polymer comprises at lest one aqueous alkali-soluble polyacrylate or poly(vinyl acetate) containing from about 5 to about 15% by weight of carboxyl group-containing comonomers.

4. A coating of claim 1 wherein the elastifying polymer comprises at least one water-dispersible polymer.

5. A coating of claim 1 wherein the coating comprises:

(1) about 20%-80% by weight of a binder comprising the porous inorganic matrix and the elastifying organic polymer, wherein the ratio by weight of porous inorganic matrix to organic polymer is from about 1:1 to about 1:5, and (2) about 80% to about 20% by weight of color paste.

6. A coating of claim 5 further comprising at least one plasticizer for the organic polymer.

7. A composition for forming a copy coating consisting essentially of:

(1) a water soluble $Zr^{+4}$ compound or a Zr/Al mixed oxide compound which upon heating in an alkaline medium containing $NH_3$ polycondensates to form zirconium oxide hydrates or zirconium/aluminum mixed oxide gels;

(2) an elastifying amount of a water-soluble or water-dispersible elastifying organic polymer for the inorganic, porous matrix film forming composition;

(3) a pigment paste colorant; and (4) water.

8. A composition of claim 7 further comprising at least one additive selected from the group consisting of a cosolvent for the organic polymer, a plasticizer for the organic polymer and a crosslinking agent for the organic polymer.

9. A composition of claim 7 wherein said organic polymer is at least one polymer selected from the group consisting of water-soluble poly(vinyl alcohol), water-soluble cellulose derivatives, water-soluble polyacrylamides, water-soluble polyacrylic acids, polyvinylpyrrolidones, dispersible poly(vinylacetate), water-dispersible vinylacetate/ethylene copolymers, a water-dispersible vinylacetate, ethylene, vinylchloride copolymers, water-dispersible polyacrylates, water-dispersible polyurethanes and SBR lattices.

10. A composition of claim 7 further comprising at least one additive selected from the group consisting of a cosolvent for the organic polymer, a plasticizer for the organic polymer and a crosslinking agent for the organic polymer.

* * * * *